United States Patent
Burman et al.

(10) Patent No.: US 7,864,693 B2
(45) Date of Patent: Jan. 4, 2011

(54) METHOD AND APPARATUS FOR ESTABLISHING A COMMUNICATION SESSION BETWEEN TWO TERMINALS

(75) Inventors: Bo Burman, Stockholm (SE); Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 10/581,320

(22) PCT Filed: Dec. 5, 2003

(86) PCT No.: PCT/SE03/01901

§ 371 (c)(1), (2), (4) Date: May 4, 2007

(87) PCT Pub. No.: WO2005/055556

PCT Pub. Date: Jun. 16, 2005

(65) Prior Publication Data

US 2007/0218924 A1   Sep. 20, 2007

(51) Int. Cl.
*H04L 12/26* (2006.01)

(52) U.S. Cl. .............. 370/252; 370/230; 370/261; 370/278; 370/320; 709/227; 709/229

(58) Field of Classification Search .............. 370/230, 370/252, 261, 271, 278, 277, 320, 352–356; 709/227–229
See application file for complete search history.

(56) References Cited

U.S. PATENT DOCUMENTS

| | | | | |
|---|---|---|---|---|
| 5,875,240 A | * | 2/1999 | Silverman | 379/142.07 |
| 5,918,179 A | * | 6/1999 | Foladare et al. | 455/445 |
| 6,061,431 A | * | 5/2000 | Knappe et al. | 379/52 |
| 7,065,070 B1 | * | 6/2006 | Chang | 370/352 |
| 2002/0094819 A1 | | 7/2002 | Cao et al. | |
| 2003/0035393 A1 | * | 2/2003 | Sinnarajah et al. | 370/335 |
| 2003/0076815 A1 | * | 4/2003 | Miller et al. | 370/352 |

(Continued)

FOREIGN PATENT DOCUMENTS

JP   A 2000-244499   9/2000

(Continued)

OTHER PUBLICATIONS

International Search Report for PCT/SE2003/001901 dated Jun. 23, 2004.

(Continued)

*Primary Examiner*—Huy D Vu
*Assistant Examiner*—Zewdu Beyen
(74) *Attorney, Agent, or Firm*—Nixon & Vanderhye P.C.

(57) ABSTRACT

A method and apparatus for establishing a requested communication session between two terminals (A, B) over a given physical channel, wherein the session requires the determination of session parameters before the session can be executed. It is determined (402) by means of at least one session key, whether any session parameters for a previous session between the terminals have been stored in the terminals. If so, the stored session parameters are retrieved (408), such that the requested session can be executed (410) based on the retrieved session parameters. In this way, delays involved with the establishment of sessions requiring the determination of parameters, e.g. in multimedia calls, can be reduced.

32 Claims, 4 Drawing Sheets

U.S. PATENT DOCUMENTS

| | | | |
|---|---|---|---|
| 2003/0229699 A1* | 12/2003 | Moran et al. | 709/227 |
| 2004/0114532 A1* | 6/2004 | Naka et al. | 370/252 |
| 2005/0003798 A1* | 1/2005 | Jones et al. | 455/410 |
| 2005/0037765 A1* | 2/2005 | Rajkotia et al. | 455/450 |
| 2007/0297393 A1* | 12/2007 | Furukawa et al. | 370/352 |
| 2008/0037566 A1* | 2/2008 | Rasanen | 370/401 |
| 2008/0075025 A1* | 3/2008 | Hall, Jr. | 370/310.1 |
| 2008/0089503 A1* | 4/2008 | Crockett et al. | 379/201.03 |
| 2008/0107094 A1* | 5/2008 | Borella et al. | 370/342 |
| 2008/0186923 A1* | 8/2008 | Westphal et al. | 370/332 |

FOREIGN PATENT DOCUMENTS

| | | |
|---|---|---|
| JP | A 2001-077855 | 3/2001 |
| JP | A 2002-218531 | 8/2002 |
| WO | 01/84790 | 11/2001 |
| WO | WO 02/082781 | 10/2002 |
| WO | 02/096139 | 11/2002 |
| WO | 03/017621 | 2/2003 |
| WO | 03/017712 | 2/2003 |

OTHER PUBLICATIONS

Summary of Japanese official action, Aug. 7, 2009 in corresponding Japanese Application No. JP 2005-511293.

* cited by examiner

METHOD AND APPARATUS FOR ESTABLISHING A COMMUNICATION SESSION BETWEEN TWO TERMINALS

This application is the U.S. national phase of international application PCT/SE2003/001901 filed 5 Dec. 2003, which designated the U.S., the entire contents of which are hereby incorporated by reference.

TECHNICAL FIELD

The technology disclosed herein relates generally to a method and apparatus for establishing a communication session between two terminals, requiring the determination of session parameters. In particular, the technology disclosed herein is concerned with reducing the duration of a session setup procedure when parameters are determined for use in that session.

BACKGROUND

Fixed and mobile telephones have so far been used mainly for making voice calls. The service of communicating limited text messages between mobile terminals, such as SMS (Short Message Service) messages, is also available. These are fairly straightforward telecommunication services which use well-established technologies under more or less fixed prerequisites. In the standardized communication protocols used for calls between fixed and/or mobile terminals, predefined sets of communication rules and parameters are typically used, which are known by the terminals and within their capabilities. Hence, it is presumed that both a calling terminal and a called terminal are capable of conducting the call based on such fixed communication parameters valid for each terminal. Therefore, a traditional call, such as a simple voice call, can be established quite fast since both terminals "know" in beforehand what parameters to use, e.g., concerning transmission and encoding schemes. No procedure is thus needed to determine which rules and parameters to use before a call can be established and executed.

A multitude of different telephony services are now being developed, which will be possible to employ in particular as new technologies for communication are introduced, providing greater network capacity and higher transmission rates. For example, GPRS (General Packet Radio Service) and WCDMA (Wideband Code Division Multiple Access) technologies are currently emerging for enabling wireless telephony services requiring a wide range of different data rates.

Some new services involve real-time transmission of video information as well as audio information, and may further include the transmission of added data representing text, documents, images, audio files and video files in various different formats and combinations. Such services are generally referred to as "multimedia" services, which term will be used in this description to represent any telephony services that involve the transfer of information in addition to ordinary voice, thereby requiring the determination of session parameters.

A great number of sophisticated new mobile terminals are also becoming available on the market which are equipped with functionality to match the new services. As a result, the terminals will have a multitude of different capabilities with respect to, e.g., codecs (coders/decoders), presentation functionality and transmission rates. The term "terminal" will be used in this description to broadly represent any type of communication station, or a group of terminals in conference using a Multipoint Conference Unit (MCU) which will represent the group of terminals in this context.

A problem that inevitably arises is that the prerequisites for each specific session using multimedia services will no longer be fixed and known in beforehand, but will vary depending on the invoked service and the capabilities of the calling and called terminals, respectively, as well as other factors. During a session, certain so-called session parameters must be used by both the calling and called terminals in order to communicate the desired information. Such session parameters define the rules of communication and may be related to available codecs and multiplexing schemes, which will be described in more detail below.

The session parameters may further depend on predefined user preferences and subscription terms, which may be tailor-made for each subscriber or defined for specific groups of subscribers. In order to establish a session between two terminals involving multimedia services, the session parameters must therefore first be selected and determined in a session setup procedure, before the actual session or call can begin and use those session parameters.

FIG. 1 illustrates schematically a typical communication scenario between two terminals A and B. In this case, terminal A is a mobile telephone being wirelessly connected to a mobile access network 100, e.g., a WCDMA network. On the other side, terminal B is a fixed telephone being connected to a fixed access network 102, e.g., a PSTN (Public Switched Telephony Network). The two access networks 100 and 102 are in turn connected to a general "backbone" network 104, which in practice may be any type of communication network, or combination of different networks. It is assumed in this example that the networks 100, 102 and 104 use more or less known transport techniques, and therefore need no further description in this context.

In the present example, terminal A calls terminal B in order to have a video session involving two-way transmission of both video and audio information. Each terminal A, B is equipped with a viewing screen Sa and Sb, respectively, and both are capable of communicating and presenting real-time video and audio. In that respect, the capabilities of the terminals A and B are fairly similar. However, they will most likely have different capabilities regarding codecs and multiplexing, as explained above, and each terminal has no knowledge of the other. Therefore, the terminals A, B must exchange information regarding their specific capabilities and preferences, in order to negotiate and agree on suitable common session parameters that both can use during the forthcoming call session. In particular, the terminals must select coding/decoding schemes (i.e. codec types), and agree on a multiplexing scheme for mixing different data streams for video and audio information on a given physical channel, such that the available bandwidth is utilized in a suitable way.

H.324 is a standard defined by the International Telecommunication Union Telecommunications Sector (ITU-T) for multimedia telephony involving real-time video and audio. H.324 has been designed to handle such communication in a flexible way between terminals having differentiated capabilities, and also allowing the use of a great variety of different services. In particular, a specification called 3G-324M has been defined, based on H.324, to support real-time communication of wireless multimedia services over existing circuit-switched wireless networks. Although the technology disclosed herein is not limited or restricted by any procedures specified in H.324, this standard will be referred to as an example of how a multimedia call can be established according to the technology disclosed herein.

Thus, before a video call between terminals A and B can begin, a communication session must be established and the session parameters to use in the call must be determined. According to H.324, establishing a communication session is divided into two procedure parts including a bearer setup phase and a session setup phase.

In the bearer setup phase, a physical communication channel is reserved throughout the communication path between the terminals A, B in both directions. The physical channel may be similar or different in the two directions, depending on whether the call is symmetric or asymmetric. A physical end-to-end channel typically comprises a series of paths through different intermediate networks, e.g. radio channels and/or fixed circuit switched voice or data channels. The details of the bearer setup phase will not be described here further, however, since they do not concern the present invention.

When the physical channel has been established, the session setup phase can be executed, which is performed only by the two terminals, without involving any intermediate network node. The session setup phase is executed in order to determine the above-mentioned session parameters that both terminals are capable of using during the call session. Hence, it is entirely up to the terminals how to utilize the given physical channel. The session setup phase typically comprises several steps, such as: 1) exchange of terminal capabilities, 2) master-slave determination, 3) selecting a multiplexing scheme, and 4) opening of logical channels. These procedure steps, basically as dictated by the H.324 standard, will now be briefly described with reference to the flow chart in FIG. 2.

In a first step 200, terminal capabilities are exchanged where each terminal sends to the other terminal at least a list comprising the codec types and a set of multiplex parameters that the terminal can handle, thereby advertising its capabilities. In H.324, such information is sent in a "TCS" (Terminal Capability Set) message, and each receiving terminal must acknowledge receipt thereof. This message can be sent again at any time during the session for updating terminal capabilities.

Master-slave determination is a necessary procedure for appointing one terminal as master and the other terminal as slave, in a next step 202, e.g. in order to avoid signalling conflicts in the communication dialogue during the session setup. According to H.324, each terminal generates a 24-bit random number called "SDN" (Status Determination Number) which is transmitted in an "MSD" (Master-Slave Determination) message, which must be acknowledged as well by the receiving terminal. A comparison of the two SDNs then unambiguously decides the master-slave appointments, according to some predefined rule. The master-slave appointments may also be used during the actual session as well.

A plurality of multiplexing schemes have preferably been defined to control how plural information streams can be multiplexed in different ways into a single bitstream to be transmitted over the physical channel established in the bearer setup phase described above. A video call typically requires at least three separate information streams for audio, video, control information and optionally other data, respectively, each requiring at least one logical channel. The ratio between the different streams can be varied dynamically, depending on the needs for transmission in each stream, in order to optimally utilize the available bandwidth, i.e. the given physical channel. For example, H.324 uses a multiplexing standard called H.223 which defines different multiplex tables controlling the allocation of various streams of audio, video, data and control information in predefined data sequences called packets. Any number of logical channels may be used, as specified by the multiplex table.

Each packet may contain a variable pattern of logical channel allocation into bit positions within the packet, and the channel allocation may be different in each successive packet. The packet length can also be varied. The channel allocation scheme for each specific packet is determined by a selected multiplex table entry as indicated by a short index number included in a header of each packet. Then, it is not necessary to transmit any further overhead information regarding the multiplexing. However, the multiplex packet structure must first be defined for each index number during the session setup phase.

Thus, following the master-slave determination step 202, suitable multiplexing schemes are selected in a next step 204, when the terminals negotiate and agree on a multiplex table configuration to use during the forthcoming session. According to H.324, each terminal then sends a so-called "MES" (Multiplex table Entry Send) message, comprising a list of index numbers and the respective packet structure definitions. The receiving terminal must also acknowledge or reject each proposed index and packet structure in a responding MES message. New and updated multiplex tables may also be sent in a further MES message at any time during a session. If a packet is received having an undefined index number, that packet will be discarded by the receiving terminal.

Finally, in a step 206, all logical channels needed for the invoked service or services are established or "opened" according to terminal capabilities which are common to both terminals. Preferably, a highest priority codec that both terminals can use for each specific media stream during the session is selected for that stream. According to H.324, one or both terminals send a so-called "OLC" (Open Logical Channel) message to the other terminal containing one or more proposed codecs, preferably with indicated priorities, with respect to the TCS message received from the other terminal in step 200. Each receiving terminal may then accept or reject the proposed codec or codecs, depending on its own capabilities and/or preferences. When the terminals have finally agreed to use a specific codec, or set of codecs, corresponding logical channels are established, and the actual session or video call can begin.

The above-described example illustrates how certain communication conditions or terms, as defined by session parameters, can be determined before a call session can be executed. It should be noted that the order of steps 202 and 204, as well as the order of steps 204 and 206, respectively, may be reversed depending on the implementation. The term "session parameters" is used here to generally represent any specifics determining how information should be communicated and interpreted. The example described above was focused on session parameters related to codecs, and multiplexing schemes. However, other important session parameters may be required, such as a parameter relating to error correction/protection which is typically included in the OLC message according to a standard H.245, which is a part of the H.324 standard.

However, it takes some time to execute the above-described bearer setup and session setup procedures. The bearer setup phase duration has been measured to be in the range of 7 to 14 seconds for establishing a call between two mobile terminals, but can probably be reduced to approximately 5 seconds if the presently available methods are made more efficient. The session setup phase duration has been measured to be in the range of 4 to 7 seconds for existing products. Since the session setup phase takes place after the bearer setup phase, the total delay before the call can begin will actually be at least in the range of 9-21 seconds. These long delays are a considerable drawback, since they reduce the attraction of multimedia services. The delays become even more tiresome if the service mode is changed during an ongoing session, such as when repeatedly switching between video mode and voice-only mode. The setup procedure must then be repeated at each switching of service modes.

Hence, it is generally desirable to minimise delays imposed by session establishment. It is difficult to reduce the duration of the session setup phase without substantially revising the standard, since it includes many different steps that must be executed consecutively, such as the steps illustrated in FIG. 2, involving several round-trip delays, among other things. This phase can be further delayed if the quality of the established and currently used physical channel is bad, resulting in bit errors in the transmitted data and the need for retransmissions. In particular, messages containing terminal capabilities, such as the TCS message in H.324, are typically quite long and will cause considerable delay if retransmitted. Such long messages can be divided into several segments that may be retransmitted separately.

In general, similar problems may exist for any type of session setup where the channel carrying the signalling messages is either subject to long round-trip delays, or have a narrow bandwidth compared to the amount of information transferred, or both, in combination with requiring plural round-trips to establish or re-establish the session. One example of another specification for session setup where these problems also may occur is SIP, "Session Initiation Protocol" (IETF RFC 3261 et al.). SIP is an application-layer control (signalling) protocol for creating, modifying and terminating sessions with one or more participants. These sessions include Internet multimedia conferences, Internet telephone calls and multimedia distribution.

Hence, a solution is needed for reducing the current long delays involved with the establishment of sessions requiring the determination of parameters, e.g. in multimedia calls. In particular, it is desirable to still use presently defined routines and standards, not requiring any new standard specifications and preferably using existing sets of signalling messages.

SUMMARY

An object of the technology disclosed herein is to reduce or eliminate the problems outlined above. This object and others are obtained by providing a method and apparatus for establishing a requested communication session between a calling terminal and a called terminal over a given physical channel, wherein the session requires the determination of session parameters before the session can be executed. The requested session may be a multimedia call requiring the transfer of separate media streams for at least audio and video.

According to the technology disclosed herein, it is determined, by at least one available session key, whether any session parameters for a previous session between the terminals have been stored in the terminals. If so, the stored session parameters are retrieved in each of the terminals, such that the requested session can be executed based on the retrieved session parameters.

The available session key or keys may include the telephone number of at least one of the two terminals. The calling terminal may use the telephone number of the called terminal as the available session key to detect a match between that telephone number and a stored session key associated with stored session parameters.

The session keys may include a primary session key and a corresponding secondary session key. At least one of the terminals, having detected a match between the primary session key and a stored session key associated with stored session parameters, may then retrieve the corresponding secondary session key and send it to the other terminal. The secondary session key can then be used by the receiving terminal to retrieve the stored session parameters, even if no primary session key was available to the receiving terminal or if the receiving terminal had not detected any match between the primary session key and any stored session key. The secondary session key may also be used to confirm that the stored session parameters have been used for a previous session between the terminals.

The primary session key may be the telephone number of at least one of the two terminals and the secondary session key may be any identification associated with the previous session. In one embodiment, the secondary session key is a random number generated during a master-slave determination step of a session setup procedure for the previous session, e.g. in accordance with the ITU-T H.245 standard. The sending terminal may then use a standard Master-Slave Determination (MSD) message containing the random number, to convey the secondary session key to the receiving terminal. The MSD message may also include an indication that the random number serves as a secondary session key. If, according to the ITU-T H.324 standard, a Terminal Capability Set (TCS) message is mandated as the very first message to be send in a session setup procedure, the receiving terminal can interpret the random number in the MSD message as a secondary session key, if no TCS message was received before receiving the MSD message.

In another embodiment, the secondary session key is a separately defined code, sequence number or the like, assigned for the previous session.

In yet another embodiment, if an INVITE message is mandated as the first message to be sent in a session setup procedure according to the Session Initiation Protocol (SIP), header field information of the INVITE message can be used as session key(s).

Each of the terminals stores session parameters used during an executed session, together with at least one session key, in order to enable the use of stored session parameters in a new session. When storing session parameters used during an executed session, each terminal preferably also sends to the other terminal a message acknowledging its capability of using stored session parameters at a later session.

The technology disclosed herein further embraces a terminal adapted to establish a requested communication session with another terminal over a given physical channel, wherein the session requires the determination of session parameters before the session can be executed. The requested session may be a multimedia call requiring the transfer of separate media streams for at least audio and video. The inventive terminal comprises means for determining, by means of at least one available session key, whether any session parameters for a previous session between the terminals have been stored in the terminal. The terminal further comprises means for retrieving the stored session parameters such that the requested session can be executed based on the retrieved session parameters, provided that the other terminal also has successfully retrieved the same session parameters.

The terminal may preferably be adapted to use the telephone number of the other terminal as available session key to detect a match between that telephone number and a stored session key associated with stored session parameters. The available session key may be a primary session key, and if a match is detected between the primary session key and a stored session key associated with stored session parameters, the terminal may be adapted to retrieve a corresponding secondary session key and send it to the other terminal. The secondary session key can then be used by the receiving terminal to retrieve the stored session parameters, even if no primary session key was available to the receiving terminal, or if the receiving terminal have not detected any match between an available primary session key and any stored session key.

When the available session key is a primary session key, the terminal may further be adapted to receive from the other terminal a corresponding secondary session key, and use it to retrieve the stored session parameters by detecting a match between that secondary session key and a stored session key associated with the stored session parameters. The terminal may also be adapted to use the secondary session key to confirm that the stored session parameters have been used for a previous session between the terminals.

The terminal may be adapted to use the telephone number of the other terminal as the primary session key and any identification associated with the previous session as the secondary session key. In one embodiment, the terminal may be adapted to use as the secondary session key, a random number generated during a master-slave determination step of a session setup procedure for the previous session, e.g. in accordance with the ITU-T H.245 standard. In that case, the terminal may be further adapted to use a standard Master-Slave Determination (MSD) message containing the random number, to convey the secondary session key, and to preferably include in the MSD message, an indication that the random number serves as a secondary session key.

Alternatively, the terminal may be adapted to use as the secondary session key, a separately defined code, sequence number or the like, assigned for the previous session. In another embodiment, if an INVITE message is mandated as the first message to be sent in a session setup procedure according to the Session Initiation Protocol (SIP), the terminal may be adapted to use header field information of the INVITE message as session key(s).

The terminal is adapted to store session parameters used during an executed session, together with at least one session key, in order to enable the use of stored session parameters in a new session. The terminal is then preferably also adapted to send to the other terminal a message acknowledging its capability of using stored session parameters at a later session.

The technology disclosed herein enables reduced delays involved with the establishment of sessions requiring the determination of parameters, e.g. in multimedia calls. Furthermore, it will be possible to still use presently defined routines, standards and existing sets of signalling messages, without requiring establishment of new standard specifications.

DETAILED DESCRIPTION OF EXAMPLE EMBODIMENTS

When a requested call or session requiring the determination of session parameters, such as a multimedia call, shall be established between two terminals, the procedure of determining session parameters can be substantially simplified, and the delay caused by the session setup can be reduced, if those two terminals have executed a similar session previously. According to the present solution, each terminal is required to store relevant session parameters used during a first session, after that session has been executed. When a second similar session is to be executed later between the same two terminals using the same telephony service, session parameters can be determined for that session by retrieving the previously stored session parameters in each terminal for use again during the second session. If the prerequisites for the new session are basically the same as for the previous session, those session parameters will still be relevant, and need not be defined once again during a time-consuming regular session setup procedure, such as the one described above. If not, any session parameter can be changed by exchanging suitable updating messages between the terminals at any time during the ongoing session.

Figure 3:
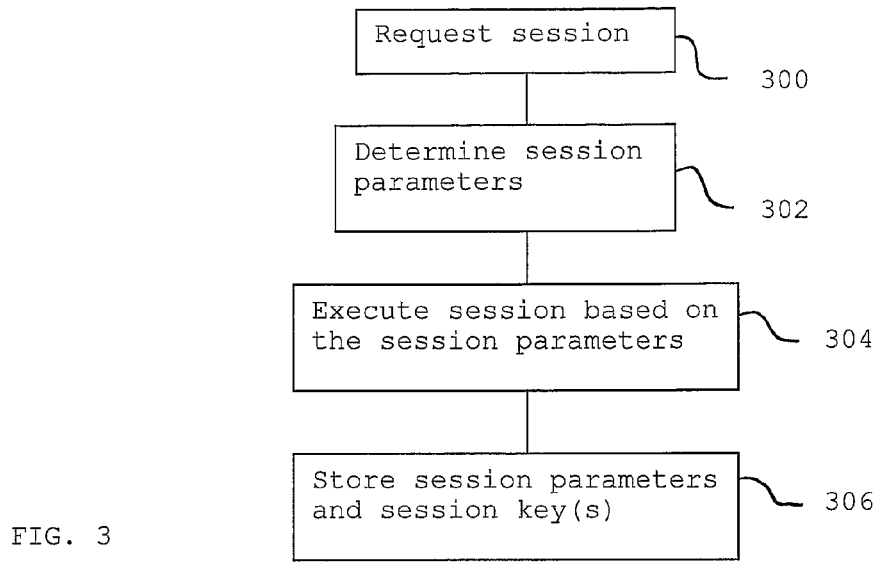
FIG. 3 is a flow chart illustrating a procedure for storing session parameters in accordance with the present technology.

A basic example embodiment will now be described with reference to the flow charts in FIG. 3 and FIG. 4, respectively. In FIG. 3, a procedure for storing session parameters for later use is illustrated. These terminals are required to store the used session parameters when executing sessions, such as multimedia calls, for which specific session parameters must be determined and used.

In a first step 300, a communication session involving multimedia is requested between two terminals having this function implemented, i.e. one terminal calls the other terminal invoking at least one specific telephony service. As mentioned above, multimedia services involve the transfer of information in addition to ordinary voice, thereby requiring the determination of specific session parameters. Accordingly, it is assumed that such parameters must be determined and used in the requested session in this case.

Figure 1:
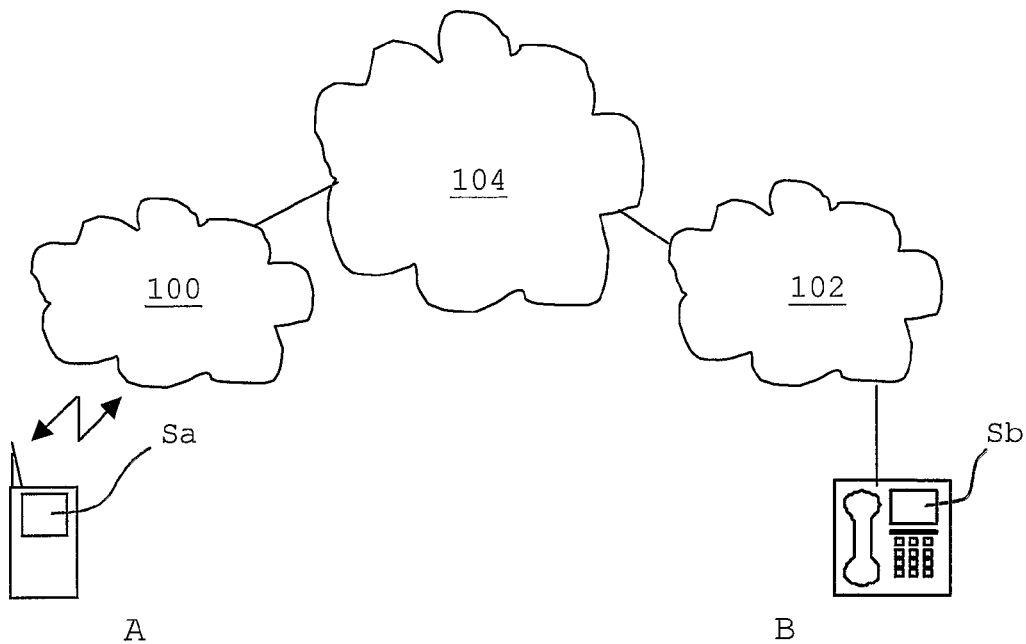
FIG. 1 is a schematic view of a communication scenario for executing a video call between two terminals.
Figure 2:
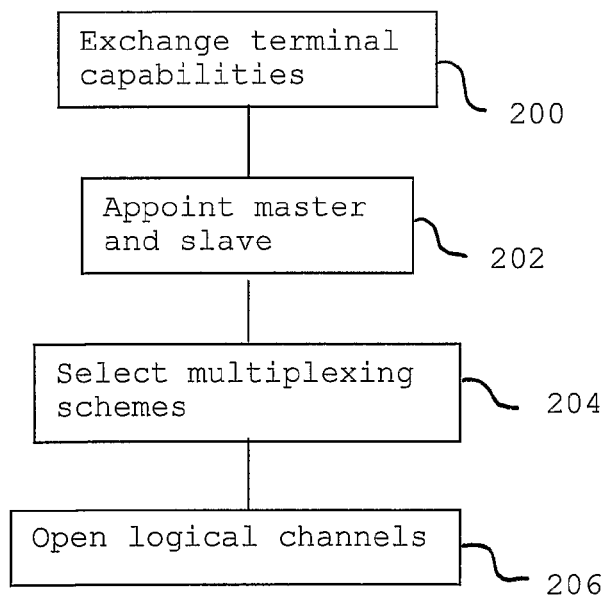
FIG. 2 is a flow chart illustrating a session setup phase during a known session establishment procedure.

Thus, in the next step 302, session parameters are somehow determined for the requested session. For example, the session parameters may be determined in a regular session setup procedure as described above in connection with FIG. 2, or otherwise. Next, the requested session is executed based on the determined parameters, in a step 304. During the session, some of the parameters may be updated, as mentioned in the example described above.

When the session is completed, the used session parameters are stored in each of the participating terminals, in a next step 306, by using suitable storing means in each terminal, such as a non-volatile memory. If the parameters have been updated during the session, the latest version of parameters is preferably stored. Furthermore, at least one key is also selected for the session which is stored together with the session parameters, in order to enable later retrieval of the stored session parameters by means of the associated session key or keys. For example, each terminal can store the telephone number of the other terminal as a primary session key for the executed session, since at least the called number will be known to the calling terminal at a later session request, and the calling number may also be known to the called terminal by means of a calling number presentation function, if available. However, any available terminal identity may be stored in the respective terminal as a primary key.

An additional secondary session key may optionally also be used to confirm, at a later session request, that the stored session parameters were really used in the present session, in order to make this solution more reliable. The secondary session key can be selected as any identification associated with the executed session, such as a separately defined code, sequence number or the like, assigned for the session. In order to enable confirmation of the session parameters, both terminals must agree on and store the same secondary session key, or alternatively, separate different keys having a known relationship. In one embodiment, the random number SDN used in the above-described master-slave determination step during the session setup phase according to H.324, can serve as a secondary session key, as will be described below in a more detailed example.

During the step 302 of determining session parameters for this session, the terminals may preferably exchange a message acknowledging their capability, respectively, of using stored session parameters at a later session. For example, if the present session is established according to H.324, this "fast setup capability" may be included in the TCS message which is the first message initiating the session setup phase. Thereby, each terminal can store the used session parameters only if both terminals have this capability. Otherwise, if one of the terminals does not have this capability, the fast session setup procedure cannot be used later anyway. In that case, there is no point in the other terminal storing the used parameters, even if it has the fast setup capability itself. When the next session is started, the session setup phase can begin by exchanging the fast setup capability of each terminal, to initiate an attempt to retrieve and use stored session parameters. Thus, if one of the terminals has not acknowledged a fast setup capability, no time should be wasted by the other terminal attempting the fast setup procedure.

Figure 4:
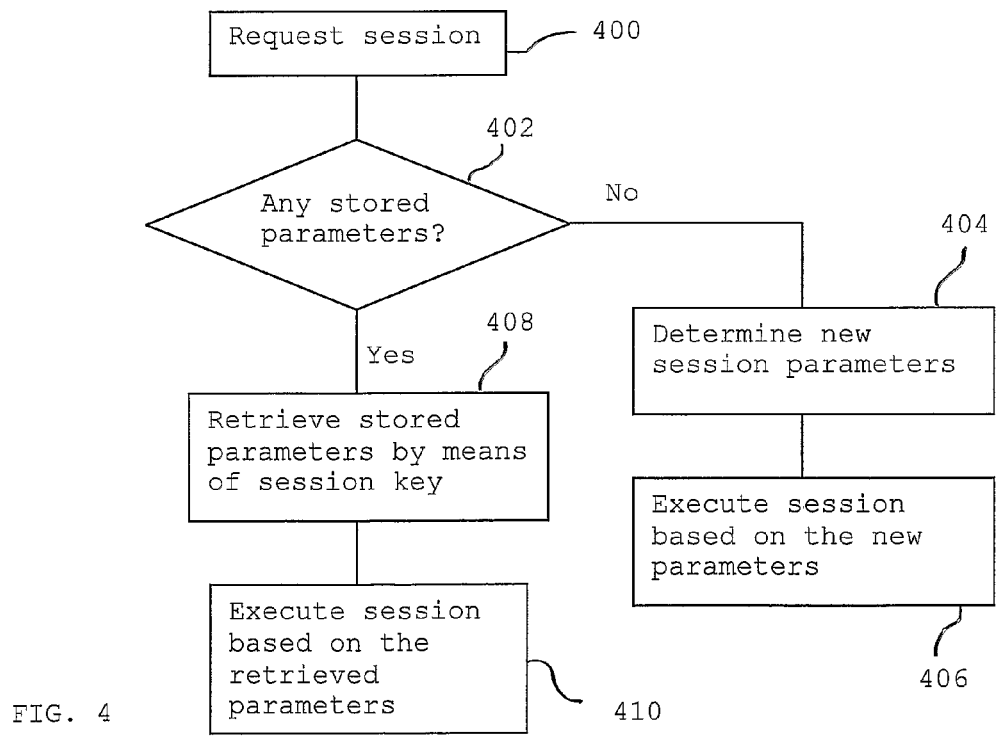
FIG. 4 is a flow chart illustrating a procedure for utilizing earlier used session parameters for a new session.

FIG. 4 is a flow chart illustrating how two terminals can utilize earlier defined session parameters for a new session, if they have stored such parameters in a previous session. In a first step 400, a communication session, e.g. involving a multimedia service, is requested between two terminals A and B. It is assumed that the session is requested by terminal A calling terminal B. It is further assumed that a physical channel is also reserved at a suitable stage, not shown, which is however not part of this procedure.

In a next step 402, it is determined whether any session parameters have been stored in connection with a previous session between the same two terminals. This determination step 402 is performed by means of the above-mentioned available session key or keys, e.g., the telephone numbers of the two terminals serving as primary keys, and optionally also a secondary key. For example, the called B-number is naturally known to terminal A, such that terminal A can investigate whether it has any stored session parameters with the B-number as a session key, by comparing the B-number with any keys being stored in terminal A. At the same time, terminal B can in the same manner investigate whether it has any stored session parameters with the A-number as a session key, if the calling A-number is available to terminal B by means of a calling number presentation function or the like.

If it is determined in step 402 that no session parameters matching the respective session key have been previously stored in the two terminals, new session parameters must be defined and determined in a step 404, by using a regular session setup procedure, such as the one described above in connection with FIG. 2. After that, the session can be executed based on the new parameters, in a step 406. In this case, the present solution will not be fully effective, since a regular, and time-consuming, setup procedure takes over in step 404.

However, if it is determined in step 402 that relevant session parameters actually have been previously stored, e.g. by detecting a match between at least one of the A- and B-number and a stored session key in at least one of the terminals A and B, the stored associated parameters can be retrieved in a step 408, by means of the session key(s). If a match was detected in any of the terminals, that terminal can send a corresponding secondary session key to the other terminal, which the receiving terminal can then compare with any stored secondary session keys. If a match is found, the receiving terminal can retrieve the corresponding session parameters by means of the secondary session key, even if that terminal did not have access to any (primary) session key in the first place, e.g. due to unavailability of A-number. After making a successful match, each terminal will of course inform the other terminal by sending a suitable acknowledge message.

If both terminals have succeeded in finding stored session parameters by using the session keys as described above, the requested session can finally be executed based on the retrieved session parameters, in a final step 410, after exchanging suitable acknowledge messages, not shown. Thereby, no time-consuming regular session setup procedure is necessary to define and determine any new session parameters, since it is assumed that the stored parameters from the previous session are still valid and can be used also for the new session. It is most likely that the prerequisites are basically the same now as they were previously, i.e. the terminals A and B have not changed their capabilities significantly.

However, if any of the terminals has changed its capabilities, or if the physical channel to be used is significantly different, the session parameters can be updated by exchanging suitable updating messages between the two terminals at any time during the session. This is however outside the scope of the present solution, and will therefore not be described here further. Alternatively, any of the terminals is free to decide that a regular setup procedure should be executed, instead of relying on previously defined and stored session parameters.

A more detailed exemplary procedure will now be described, with reference to a flow chart illustrated in FIG. 5a-c, of how stored session parameters can be retrieved and used for a requested session, optionally using H.324 standard messaging between two terminals. As in the previous example, it is assumed that a session is requested by a terminal A calling a terminal B, and that a physical channel is also reserved for the session in a bearer setup procedure at a suitable stage, although not shown or described per se. In a first step 500, a communication session requiring specific session parameters, e.g. by involving a multimedia service, is requested between the two terminals A, B. The procedure is then divided into a left branch for terminal B and a right branch for terminal A.

In a step 502B of the left branch, terminal B determines whether the A-number is available, e.g., by means of a number presentation function. It may not be available, for example, if the access network to which terminal B is currently connected does not support calling number presentation, or if the A-number is a secret number. If the A-number is made available to terminal B, it can be used as a primary session key and be compared with any stored session keys in terminal B, in order to determine whether a match exists, in a step 504B. However, if the A-number is not available, or if terminal B did not find any match for the A-number in step 504B, as indicated by dashed lines from steps 502B and 504B, respectively, terminal B may still be able to retrieve relevant session parameters by means of a secondary session key, provided that terminal A finds a match ("Yes" from step 504A), which will be described later.

In the right branch from step 500, terminal A uses the B-number, which of course is known to terminal A, as a primary session key, and compares it with any stored session keys, in a step 504A. If no match is detected in any of the terminals A, B, no session parameters can be retrieved and a regular (and time-consuming) session setup procedure must be executed to determine new session parameters, as indicated in a step 506. However, if terminal A did not find any match for the B-number in step 504A, terminal A may still be able to retrieve relevant session parameters by means of a secondary session key, as indicated by a dashed line from step 504A, provided that terminal B finds a match ("Yes" from step 504B). Thus, if one or both terminals detect a match, they will be able to retrieve corresponding session parameters and execute the fast setup procedure. The A-number, if available, can serve as a primary session key for terminal B, and the B-number can serve as a primary session key for terminal A.

In order to confirm that the session parameters corresponding to the primary session key(s) are the correct ones, i.e. that they have been used in a previous session between these two terminals A and B, a secondary session key can be used in the following manner. Thus, one of the terminals, having detected a match between a first session key and its stored data, can retrieve a corresponding secondary session key, which has also been stored after the previous session, e.g. as explained above in connection with step 306 in FIG. 3, and send the secondary key to the other receiving terminal, in a next step 508. It should be noted that anyone of the terminals A and B can be the sending or receiving terminal at this stage. In this example, an SDN generated in a master-slave determination step during the previous session was stored as the secondary session key, although any identification associated with the executed session can alternatively be selected as a secondary session key, as mentioned above.

In order to convey the SDN (i.e. secondary session key) to the other terminal, an MSD message can be used in a slightly modified manner, and be sent at this stage in step 508, containing the previously stored SDN serving as the secondary key. The MSD message may be modified by including some indication that the SDN serves as a secondary key, to inform the receiving terminal that the MSD message is in this case not intended to determine a master-slave appointment, as in a conventional MSD message. In one embodiment, this may be indicated by the simple fact that the MSD message is sent before any TCS message is sent, which is otherwise mandated as the very first message to send, according to H.324. The receiving terminal will then interpret the SDN as a secondary session key, if no TCS message was received previously.

If both terminals have detected a match in steps 504A and 504B, respectively, anyone of them can send the secondary session key, in this case contained in an MSD message, to the other. Here, it is assumed that only one terminal sends the secondary key in step 508. For clarity, the following part of the procedure is divided into two separate sections: FIG. 5b illustrates steps performed by the terminal receiving the secondary key, and FIG. 5c illustrates steps performed by the terminal sending the secondary key.

Figure 5A:
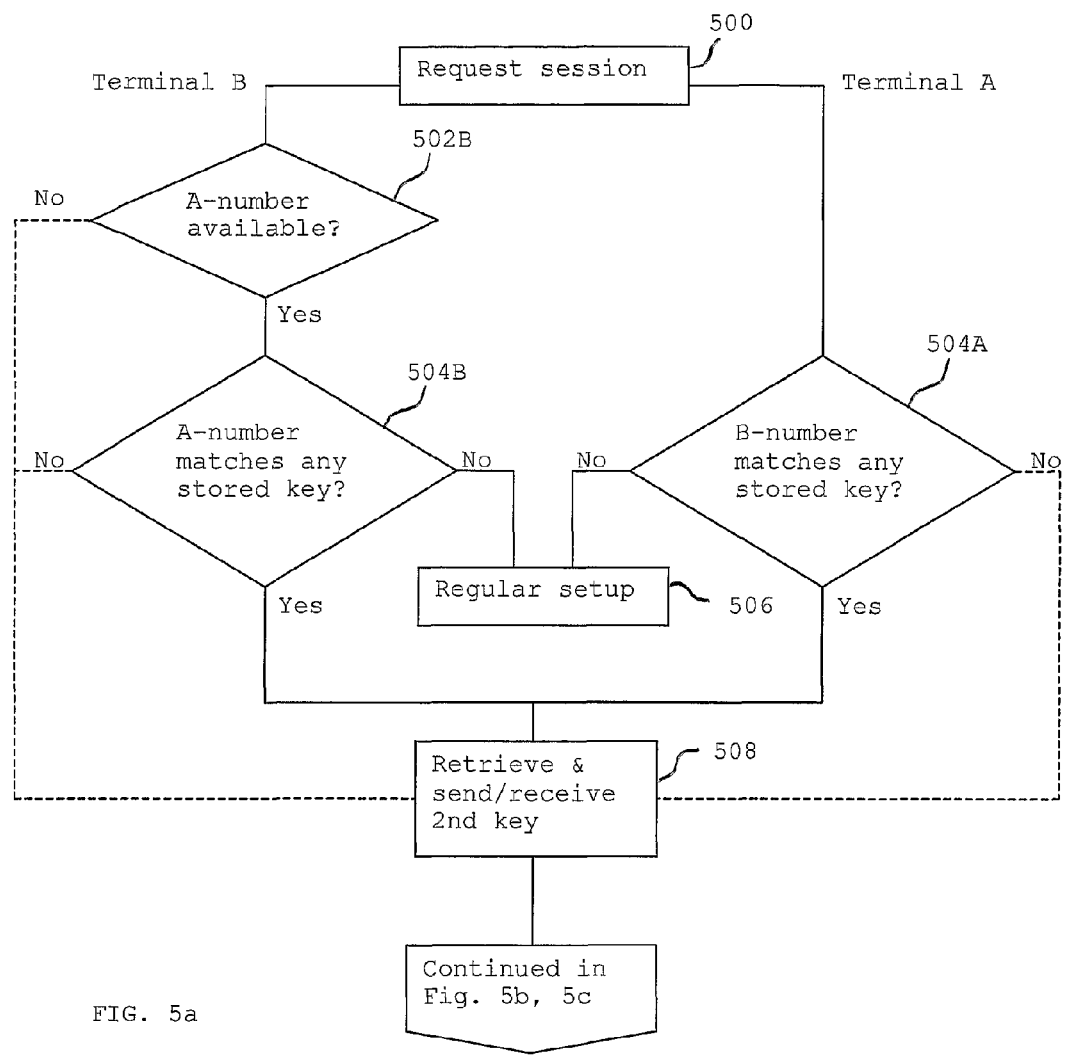
FIGS. 5a-c are different parts of a flow chart illustrating a detailed exemplary procedure for determining session parameters for a requested session.
Figure 5B:
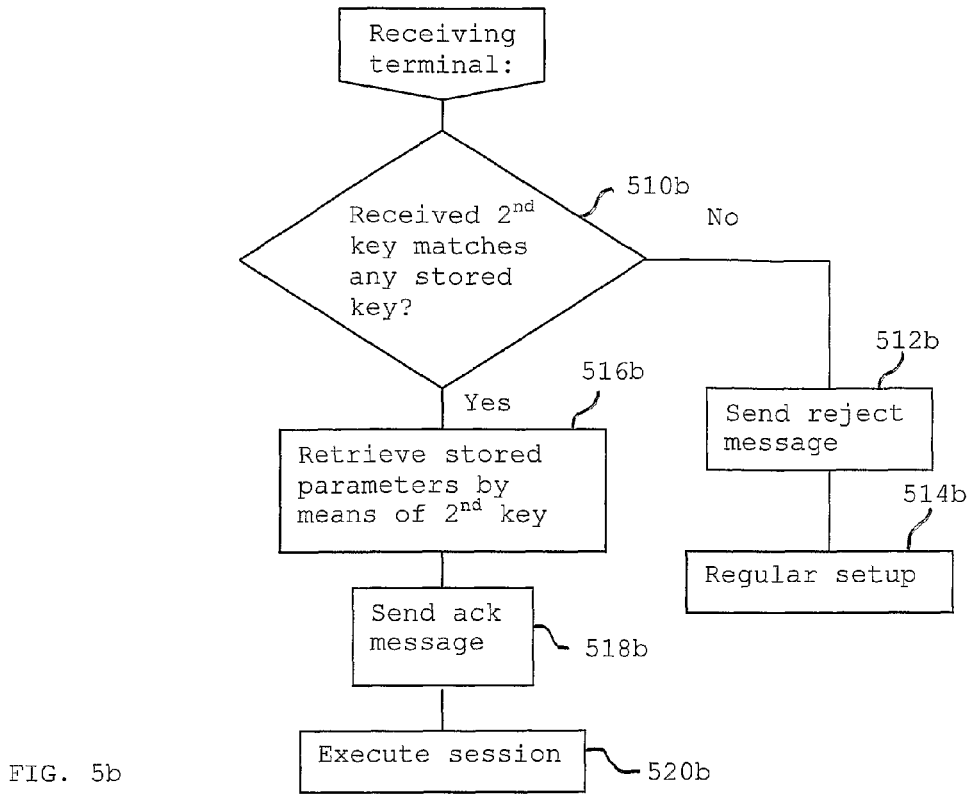

Upon receiving the secondary session key (in the MSD message), the receiving terminal checks whether the received secondary key, in this case SDN, matches any of its stored secondary session keys, in a next step 510b of FIG. 5b. If the receiving terminal does not detect any match in step 510b, a reject message may be sent to the other terminal in a step 512b. In that case, the regular setup procedure must take over, in a next step 514b, as similar to step 506. Alternatively, the mere absence of an acknowledgement after a time-out period can be interpreted as a rejection, wherein step 512b can be omitted.

However, if the receiving terminal actually detects a match in step 510b, i.e. the received SDN corresponds to a stored secondary key, the receiving terminal can retrieve the associated session parameters, in a following step 516b. The terminal may also send a suitable fast setup acknowledge message to the other terminal, such as an ordinary MSDAck message according to the standard, in a step 518b. Then, the terminal is ready to execute the session, based on the retrieved session parameters, in a step 520b.

Figure 5C:
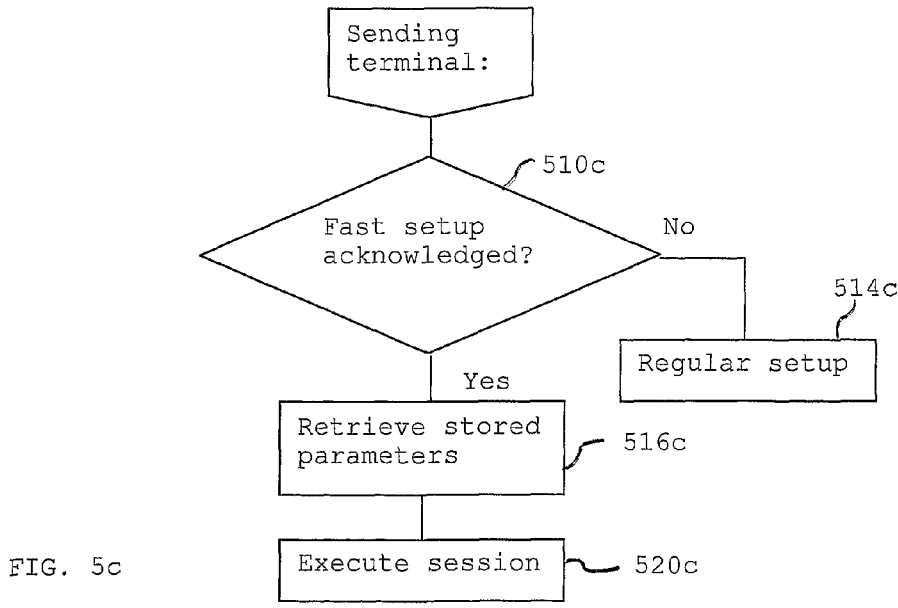

With reference to FIG. 5c, the terminal having sent the secondary key waits for acknowledgement or rejection from the receiving terminal. If no message is received in a step 510c acknowledging a fast setup (or if a rejection message is received), the terminal reverts to the regular setup procedure, in a next step 514c corresponding to step 514b in FIG. 5b. However, if a fast setup acknowledgement is received in step 510c, the terminal will retrieve the stored session parameters in a step 516c, by using either the secondary key or the primary key, or both. Finally, the session can be executed, based on the retrieved session parameters, in a step 520c corresponding to step 520b in FIG. 5b.

The above-described procedure of FIG. 5a-c can be modified in several ways, within the scope of the present invention. For example, the sending terminal may perform the determination step 510c based on whether an acknowledge message is received from the other terminal, which may be sent in step 518b. After successful retrieval of session parameters, suitable acknowledge messages may be sent by both terminals, or by only one wherein the terminal first receiving acknowledgement need not send any acknowledgement.

If the receiving terminal is terminal B and the A-number was available in step 502B, terminal B can in step 510 simply compare the received secondary key, i.e. SDN, with its stored secondary key corresponding to the primary key, i.e. the A-number. This applies also if the receiving terminal is terminal A, to which the B-number is always available. However, if the receiving terminal is terminal B and the A-number was not available, terminal B must compare the received SDN with any other stored secondary keys in order to determine whether a match exists.

It should be noted that even if terminal B cannot use the A-number as a primary key to detect a match in step 504B due to its unavailability, the situation can be saved by using the secondary session key, as in steps 508, 510 and 516. Hence, even though the use of a secondary session key is optional to the present solution, it can enable the fast session setup in the above-mentioned situation, and will anyway significantly increase the reliability of this procedure. The present solution enables a significant reduction of the current long delays involved with session establishment, by avoiding the time-consuming regular setup procedure as far as possible. If the inventive fast setup procedure is used instead, the session setup duration for, e.g., a 3G-324M call may be reduced to approximately less than a second. Moreover, it can be implemented within the presently defined routines and standards, not requiring any new standard specifications. Preferably, existing sets of signalling messages can still be used.

Some general and non-limiting aspects are given below of how the technology disclosed herein may be implemented in some practical applications. It should be noted that the following items are merely optional, and any number of them may be considered in practice.

A) The inventive fast session setup is particularly suitable for well-defined "stable" services using a session protocol where session parameters are rarely changed.

B) A receiving terminal may be able to avoid initiating a fast session setup erroneously by, e.g., detecting the service type to be applied, which may be detected by means of a service type indication sent during a physical channel setup (not further described here), or by detecting the service type in advance from, e.g., the type of terminal, network, or called number.

C) Any procedure required before the session setup starts, such as e.g. signalling channel configuration and setup, would typically be unchanged, as the solution involves only modifications to the signalling during session setup.

D) The session setup signalling would be executed by using at least one message or parameter that is unique enough to be used as a session key to retrieve stored session parameters. Depending on the session protocol used, this message or parameter may be either an existing one, or a new one defined specifically for this purpose.

E) The stored session parameters may be either accessible by the service type (e.g. from physical channel setup parameters), or by an identification number (e.g. the calling party number) of the remote terminal, or by a session key that may, e.g., include information from suitable parameter(s) from one or more of the regular session setup messages, or by any combination thereof, subject to availability on a case-by-case basis depending on, e.g., the type of network used. Even if one or more of the above-mentioned keys are currently not available or not unique, the present solution can still be used successfully and may be invoked depending on the requirements in the specific implementation. It may be appropriate to allow the retrieval of stored session parameters only if entries of the remote party are present in a phone book or the like.

F) Currently used session parameters (optionally also updates) are preferably saved in a temporary storage during the session. When the session is terminated, completely new session parameters may be stored, or existing ones may be replaced or updated, mapping the session parameters e.g. to a specific identification number, service type or session key(s), serving as the present session key. Optionally, the user may be prompted to select whether to save or discard the session parameters. The user may also be given the option to select whether to overwrite old session parameters or not. For the case when, e.g., no primary session key in the form of a phone number or the like is available, the user may be prompted to select how to identify the session parameters for later retrieval, e.g. by connecting it to an existing phone book entry.

G) The message that suggests the use of this solution, possibly also carrying the session key(s), will henceforth be denoted the 'key message'. The key message is intended to trigger the recognition on the receiver side of the inventive fast setup procedure. This may be accomplished by receiving the key message out of an expected sequence, or be detectable by other suitable means available in the session signalling in question.

H) It should be possible for the receiver to somehow reject the "key message" that would provide for a seamless fallback to the regular session setup. Rejection may be accomplished in several ways depending on the used session signalling scheme and includes, but is not limited to, explicit rejection messages and timeout with no response.

I) It is important but not essential that session parameters can be updated during the session. This would reduce the impact of slightly inappropriate stored parameters, if they can be updated during the new session. It should be noted that the present solution is primarily intended to accomplish a quick session re-establishment, and it may be less important that the session is in some way non-optimal at an initial stage of the session.

J) Optionally, a method may be used to select what version of updated session parameters used during an executed session should be valid at the start of a new re-established session. If no such method is available, a version must be defined by the specific solution, e.g. the first or latest valid one. If available, sequence (or otherwise) numbered acknowledgements to the session messages that convey session parameters may be used. This information may also be conveyed as a part of the "key message", if feasible. No selection must be sent if only one version was available during the executed session.

K) Some conditions when stored session parameters should not or cannot be used, are given below. It should be noted that either terminal may initiate a regular session setup by rejecting the "key message". Hence it is sufficient that any of the conditions outlined below is fulfilled for one terminal.

a) No stored session parameters are available, e.g. if the two terminals execute a first session, or if the stored session parameters have been corrupted, lost or deleted.

b) Any session parameter, e.g. codec, is set to fixed value for new session, that conflicts with stored session parameters. Such settings can sometimes be made by the user or by other means, e.g. by changing the hardware configuration or peripherals. This will also be the case when session parameters are stored in a peripheral (e.g. a SIM card) that is removed from one device and inserted into another one (the device could be considered as a "peripheral" to the stored parameters).

c) Optionally, a regular session setup should be performed when the transport and/or signalling channel configuration is different from the one used in the executed session, in a way that would significantly change the session signalling if started normally. For example, different multiplex levels may be used for the specific case of 3G-324M.

d) Optionally, a regular session setup should be performed at regular intervals, to avoid repeating the use of one set of parameters, although resulting in the drawback that the service setup duration will vary greatly.

e) Optionally, a regular session setup may be performed as an active choice by the user.

In the foregoing description, reference has been made to the H.324 standard as an example application. Alternatively, the fast setup procedure may also be applied in the well-known SIP (Session Initiation Protocol) standard, which has been defined for communication between terminals over IP (Internet Protocol) based networks. In SIP, a method called "INVITE" is used to initiate a session setup, involving the exchange of an INVITE message called SDP (Session Description Protocol) between the two terminals. The SDP message basically corresponds to the TCS message in H.324, where the terminals exchange their capabilities.

To implement the above-described fast setup procedure, a header field in the INVITE message called "Call-ID" may be used as the common secondary key that both terminals may store together with used session parameters, after a session according to SIP has been executed. Furthermore, a "content-length=0" header field may be utilised by the terminals to indicate their capability of executing the fast setup, in contrast to the regular setup that should include an SDP content with a 'content-length' greater than zero. When initiating a new session, it is not necessary to re-specify the entire SDP, although it may be preferable that the INVITE message is as close as possible to a regular one, as it is also used to establish the physical channel by intermediate nodes in the transmission path. Thus, it is desirable to avoid changing the procedure for these intermediate nodes. If the fast setup is not possible for one terminal, for some reason, a fallback to the regular setup can be triggered by that terminal sending a response having a body with SDP, or alternatively a return code indicating an SDP failure.

While the technology disclosed herein has been described with reference to specific example embodiments, the description is only intended to be illustrative and should not be taken as limiting. Various alternatives, modifications and equivalents may be used without departing from the spirit of the appended claims.

The invention claimed is:

1. A method of establishing a requested multimedia communication session over a given physical channel between a calling terminal and a called terminal having differentiated capabilities, comprising:
    determining common multimedia session parameters to be used by both the calling terminal and the called terminal during the requested multimedia communication session that define how multimedia information should be communicated and interpreted and which depend on multimedia communication capabilities of the calling and called terminals before the requested multimedia communication session can be executed,
    determining whether any common multimedia session parameters for a previous multimedia communication session between the calling and called terminals have been stored in both the calling and the called terminals in connection with said previous multimedia communication session, by using at least one available session key that has been selected for said previous multimedia communication session and stored together with session parameters for said previous multimedia communication session, and
    if said common multimedia session parameters have been stored in both the calling and the called terminals, retrieving the stored common multimedia session parameters in each of the terminals by using said at least one session key in order to execute the requested multimedia communication session based on the retrieved session parameters, wherein the common multimedia session parameters include multiplexing scheme information indicating how plural information streams can be multiplexed in different ways into a single bitstream to be transmitted over a physical channel established between the terminals for the multimedia communication session.

2. A method according to claim 1, wherein the available session key or keys includes the telephone number of at least one of the two terminals.

3. A method according to claim 2, wherein the calling terminal uses the telephone number of the called terminal as the available session key to detect a match between that telephone number and a stored session key associated with stored session parameters.

4. A method according to claim 1, wherein the session keys include a primary session key and a corresponding secondary session key, wherein at least one of the terminals, having detected a match between the primary session key and a stored session key associated with stored session parameters, retrieves the corresponding secondary session key and sends it to the other terminal.

5. A method according to claim 4, wherein the secondary session key is used by the called terminal to retrieve the stored session parameters, even if no primary session key was available to the called terminal or if the called terminal had not detected any match between the primary session key and any stored session key.

6. A method according to claim 4, wherein the secondary session key is used to confirm that the stored session parameters have been used for the previous multimedia communication session between the terminals.

7. A method according to claim 4, wherein the primary session key is the telephone number of at least one of the two terminals and the secondary session key is any identification associated with the previous multimedia communication session.

8. A method according to claim 7, wherein the secondary session key is a random number generated during a master-slave determination step of a session setup procedure for the previous multimedia communication session, in accordance with the ITU-T H.245 standard.

9. A method according to claim 8, wherein the sending terminal uses a Master-Slave Determination (MSD) message containing the random number to convey the secondary session key to the called terminal.

10. A method according to claim 9, wherein the MSD message includes an indication that the random number serves as a secondary session key.

11. A method according to claim 7, wherein the secondary session key is a separately defined code or sequence number assigned for the previous multimedia communication session.

12. A method according to claim 9, wherein, according to the ITU-T H.324 standard, a Terminal Capability Set (TCS) message is mandated as the very first message to be send in a session setup procedure, wherein the called terminal interprets the random number in the MSD message as a secondary session key, if no TCS message was received before receiving the MSD message.

13. A method according to claim 1, wherein an INVITE message is mandated as the first message to be sent in a session setup procedure according to the Session Initiation Protocol (SIP), wherein header field information of the INVITE message is used as session key(s).

14. A method according to claim 1, wherein each of the terminals store session parameters used during an executed session, together with at least one session key, in order to enable the use of stored session parameters in a new session.

15. A method according to claim 14, wherein each terminal also sends to the other terminal a message acknowledging its capability of using stored session parameters at a later session.

16. A method according to claim 1, wherein the requested multimedia communication session is a multimedia call requiring the transfer of separate media streams for at least audio and video.

17. A method according to claim 1, wherein the common multimedia session parameters include supported codec information regarding one or more codecs supported by each terminal.

18. A terminal configured to establish a requested multimedia communication session with another terminal over a given physical channel, the terminals having differentiated capabilities, the terminal being configured to:

determine common multimedia session parameters to be used by both terminals during the requested multimedia communication session that define how information should be communicated and interpreted and which depend on multimedia communication capabilities of the terminals before the requested multimedia communication session can be executed, determine whether any common multimedia session parameters for a previous multimedia communication session between the terminals have been stored in the terminal in connection with said previous multimedia communication session based on at least one available session key that has been selected for said previous multimedia communication session and stored together with session parameters for said previous multimedia communication session, and retrieve the stored common session parameters based on said at least one session key in order to execute the requested multimedia communication session based on the retrieved session parameters, provided that the other terminal also has successfully retrieved the same session parameters, wherein the common multimedia session parameters include multiplexing scheme information indicating how plural information streams can be multiplexed in different ways into a single bitstream to be transmitted over a physical channel established between the terminals for the multimedia communication session.

19. A terminal according to claim 18, wherein the terminal is arranged to use the telephone number of the other terminal as available session key to detect a match between that telephone number and a stored session key associated with stored session parameters.

20. A terminal according to claim 18, wherein the available session key is a primary session key, and if a match is detected between the primary session key and a stored session key associated with stored session parameters, the terminal is arranged to retrieve a corresponding secondary session key and send it to the other terminal, such that the secondary session key can be used by the called terminal to retrieve the stored session parameters, even if no primary session key was available to the called terminal, or if the called terminal have not detected any match between an available primary session key and any stored session key.

21. A terminal according to claim 20, wherein the terminal is arranged to use the secondary session key to confirm that the stored session parameters have been used for the previous multimedia communication session between the terminals.

22. A terminal according to claim 20, wherein the terminal is arranged to use the telephone number of the other terminal as the primary session key and any identification associated with the previous multimedia communication session as the secondary session key.

23. A terminal according to claim 22, wherein the terminal is arranged to use as the secondary session key, a random number generated during a master-slave determination step of a session setup procedure for the previous multimedia communication session, in accordance with the ITU-T H.245 standard.

24. A terminal according to claim 23, wherein the terminal is arranged to use a Master-Slave Determination (MSD) message containing the random number, to convey the secondary session key.

25. A terminal according to claim 24, wherein the terminal is arranged to include in the MSD message, an indication that the random number serves as a secondary session key.

26. A terminal according to claim 22, wherein the terminal is arranged to use as the secondary session key, a separately defined code or sequence number assigned for the previous multimedia communication session.

27. A terminal according to claim 18, wherein the available session key is a primary session key, and the terminal is arranged to receive from the other terminal a corresponding secondary session key, and use it to retrieve the stored session parameters by detecting a match between that secondary session key and a stored session key associated with the stored session parameters.

28. A terminal according to claim 18, wherein an INVITE message is mandated as the first message to be sent in a session setup procedure according to the Session Initiation Protocol (SIP), wherein the terminal is arranged to use header field information of the INVITE message as session key(s).

29. A terminal according to claim 18, wherein the terminal is arranged to store session parameters used during an executed session, together with at least one session key, in order to enable the use of stored session parameters in a new session.

30. A terminal according to claim 29, wherein the terminal is arranged to also send to the other terminal a message acknowledging its capability of using stored session parameters at a later session.

31. A terminal according to claim 18, wherein the requested multimedia communication session is a multimedia call requiring the transfer of separate media streams for at least audio and video.

32. A terminal according to claim 18, wherein the common multimedia session parameters include supported codec information regarding one or more codecs supported by each terminal.

* * * * *